(No Model.)
O. LONG.
FILTER.
No. 260,106.　　　　　Patented June 27, 1882.
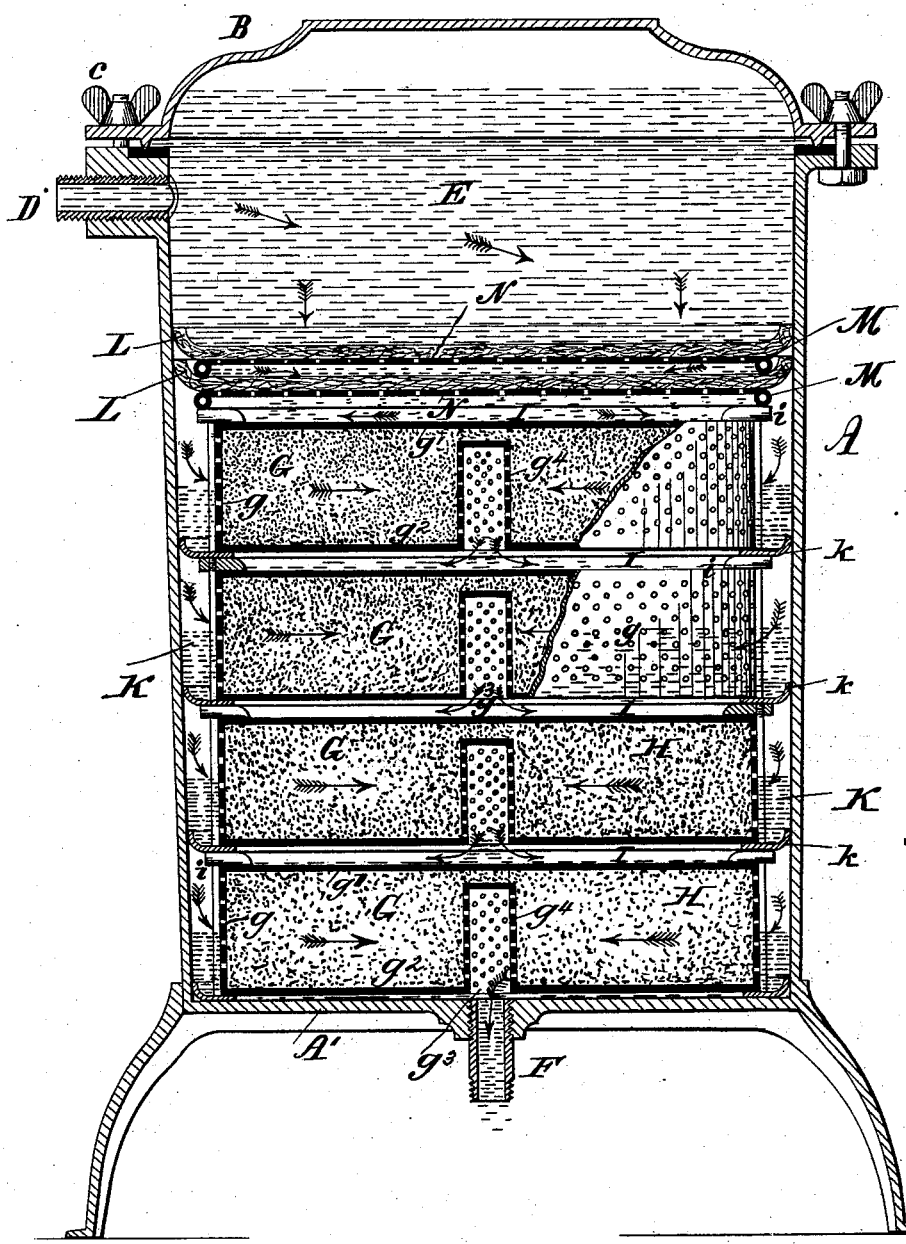
WITNESSES:
S. J. VanStavoren
C. C. Connolly
INVENTOR,
Oliver Long,
By Connolly Bros,
ATTORNEYS.

UNITED STATES PATENT OFFICE.

OLIVER LONG, OF BROOKLYN, NEW YORK, ASSIGNOR TO MICHAEL H. HAGERTY, OF SAME PLACE.

FILTER.

SPECIFICATION forming part of Letters Patent No. 260,106, dated June 27, 1882.

Application filed November 8, 1881. (No model.)

*To all whom it may concern:*

Be it known that I, OLIVER LONG, a citizen of the United States, residing at Brooklyn, in the county of Kings and State of New York, have invented certain new and useful Improvements in Filters; and I do hereby declare the following to be a full, clear, and exact description of the invention, reference being had to the accompanying drawing, which forms part of this specification, and which is a vertical transverse section of a filter embodying my improvements.

My invention has for its object to effectually clarify and purify water and other liquids, and to do this by means of a compact and simply-constructed apparatus. To clarify water or other liquid is to remove from it those impurities which are palpable and give it a turbid or muddy appearance. To purify it is to remove organic impurities which are impalpable, but may be more noxious than those which are seen. To clarify is a mere mechanical operation of straining. To purify is an absorptive action dependent upon the affinity which animal charcoal has for organic impurities in suspension or solution in liquid passed through it. To effect such purification it is necessary that the liquid should remain in contact with charcoal a sufficiently long time or traverse a sufficiently large body of such material to permit the latter to extract the organic impurities from the former.

My invention relates particularly to the construction of a filter in which by providing a series of chambers through which the liquid to be purified successively passes, entering at the periphery or outer wall of each such said chamber and emerging at the center, such liquid is maintained in contact with charcoal for a very much longer time than it would if passed vertically through the same in the ordinary manner.

Referring to the accompanying drawing, A indicates a strong tight vessel, preferably of metal, in the form of a cylinder, with detachable top B, flange-bolted to the body, as shown by bolts $c$ $c$.

D represents the inflow-pipe, entering near the top of the vessel to a chamber E in the upper part thereof, and F is the outflow or discharge located centrally in the bottom A'.

G G are the purifying-chambers, having perforated walls or peripheries $g$ and closed or tight tops and bottoms $g'$ and $g^2$, respectively. In the bottom of each chamber is an opening, $g^3$, communicating with a central eduction-tube, $g^4$, whose walls are perforated or foraminated, as shown. Surrounding this eduction-tube, and wholly filling the space between it and the wall $g$, is animal charcoal H, in a finely-divided condition and tightly packed. The lower chamber, G, rests upon the bottom of the vessel A, and the other chambers are supported above upon one another, as shown, being separated by buttons $i$ $i$, which leave intervening spaces I between the chambers, as shown. The chambers G are of less diameter than the internal diameter of the vessel A, thus leaving water-spaces K K around each chamber, having communication between the buttons $i$ $i$ with the spaces I. The spaces K K are divided from each other by water-tight gaskets or packing-rings $k$ $k$.

L L are felt disks, separated from each other by a metallic ring, M, and located between perforated metallic diaphgrams N N. These two disks are located above the upper purifying-chamber, fitting tightly against the walls of the vessel A. Above them is the chamber to which the liquid to be clarified and purified enters. Leaving this chamber it descends under pressure through the felt disks, which clarify it by removing palpable impurities. It reaches the first space I, and thence flows into the communicating annular space K surrounding the first purifying-chamber. From the latter it passes through said first purifying-chamber G. Entering through the outer wall or periphery of the latter, traveling thence to the center, and emerging from the eduction-tube $g^4$ into the space I below. From this latter it passes to the next annular space K, thence through the next purifying-chamber, and so on through the entire series, entering always at the rim or periphery and emerging at the center of each chamber. By this means the fluid has to follow a sinuous or tortuous and very much more elongated course than it would have if it passed in a direct vertical line through the chambers. Hence it is kept in actual contact with the charcoal a much longer time and practically traverses a much larger body of charcoal or a greater extent of absorbing surface or area of the latter than it would if merely passing vertically through an equal volume of the same material. It follows that the purification effected is much more thorough than is achieved by direct vertical filtration.

As the felt disks remove all the gross impurities, none of the latter descend to the purifying-chambers, and the latter are reserved unfouled by such accretions, for the performance of their legitimate function of purifying or eliminating by absorption the organic impurities in the clarified fluid.

When the felts become fouled they can be readily removed by first taking off the top B and replaced by clean duplicates, which should be provided for the purpose.

While I have specified charcoal as the purifying medium, I do not limit my invention to the employment thereof. For purifying water I do intend to use charcoal; but for clarifying wine or other liquors, pumice-stone or equivalent medium may be substituted as the filtering medium and form the filling of the cylinders.

What I claim as my invention is as follows:

1. In a filter, a series of two or more purifying-chambers having foraminated walls and central eduction-tubes, the spaces between such walls and tubes being filled with charcoal or equivalent medium, said chambers being placed one above another in a vessel, leaving intervening liquid-spaces between them and annular or surrounding liquid-spaces, separated by packing, whereby liquid passing through said vessel has to travel from the periphery to the center of each chamber, substantially as set forth.

2. In combination with vessel A and purifying-chambers G G, the felt disks L L, for clarifying the liquid before admitting it to the purifying-chamber, said disks being elevated above the top purifying-chamber, leaving a space, I, between them and said chamber, and fitting tightly in the vessel A, substantially as set forth.

In testimony that I claim the foregoing I have hereunto set my hand this 3d day of November, 1881.

OLIVER LONG.

Witnesses:
JOHN W. STEWARD,
S. J. VAN STAVOREN.